Dec. 16, 1969 J. E. MADDEN 3,483,608
PIPE AND PIPE SECTION ASSEMBLY AND DISASSEMBLY TOOL
Filed June 10, 1968
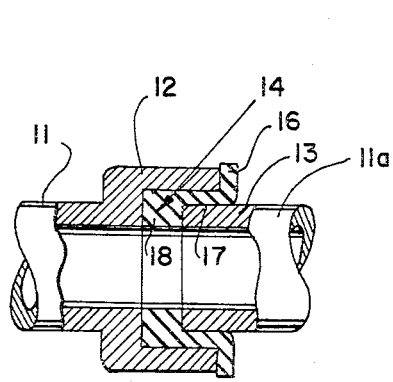
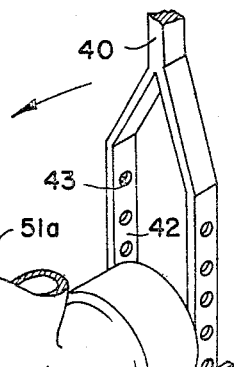
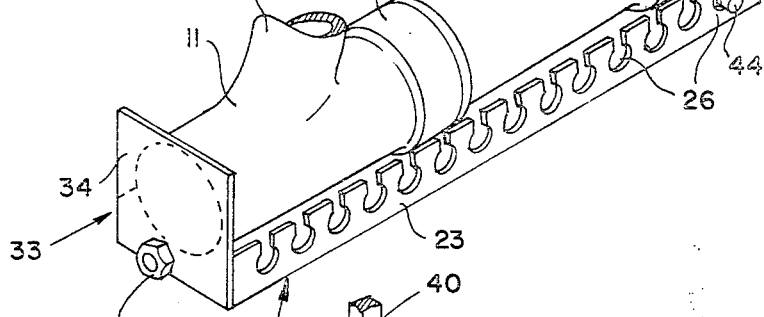
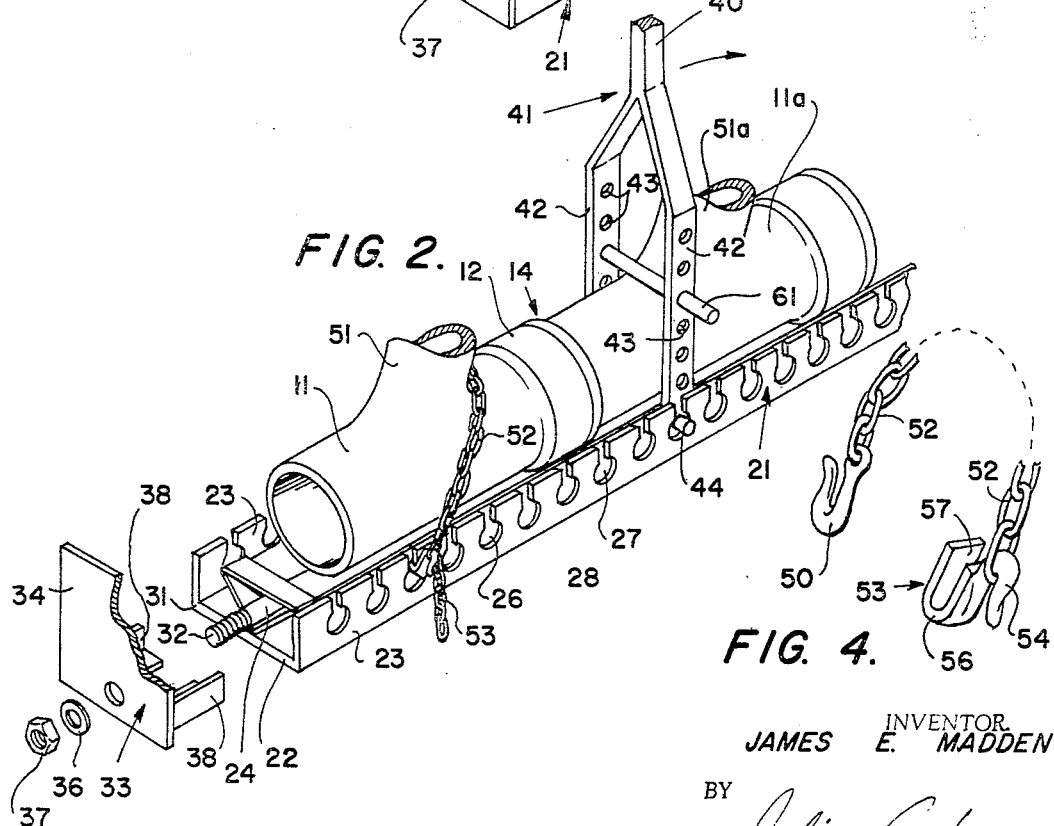
INVENTOR
JAMES E. MADDEN
BY
Julian Caplan
ATTORNEY United States Patent Office 3,483,608
Patented Dec. 16, 1969

3,483,608
PIPE AND PIPE SECTION ASSEMBLY AND
DISASSEMBLY TOOL
James E. Madden, San Mateo, Calif.
(P.O. Box 73, Burlingame, Calif. 94010)
Filed June 10, 1968, Ser. No. 735,628
Int. Cl. B23p 19/04
U.S. Cl. 29—237                                        6 Claims

ABSTRACT OF THE DISCLOSURE

A tool used in assembling and disassembling pipe sections and fittings which are sealed together by rubber collars. The tool has a channel with a support for the pipe on the bottom of the channel and the sides are formed with longitudinally spaced keyhole slots. A lever has lugs which fit into opposed slots. Operation of the level applies a straight pull or push to the pipe sections.

---

This invention relates to a new and improved pipe and pipe section assembly and disassembly tool. At present, sewer and soil pipe and pipe sections as commercially available are formed with joints adapted to receive rubber collars which seal the joints. It is essential in assembling the sections that a straight push of one section against the other be performed or else the collar interposed between the ends of the sections will deform and the joint will be imperfect. The present invention provides a tool which holds the two pipes or pipe fittings in alignment so that a straight push or pull may be applied. The tool further has a lever which may be installed at various longitudinally spaced locations and which is so constructed that when the lever is actuated it applies to one of the sections a straight push. An abutment is provided holding the other section in place, said abutment also being adjustable in position. Accordingly, it is a principal object of the present invention to provide means for holding one of the pipe sections or fittings stationary while a direct push or pull is applied to the mating section or fitting.

A still further feature of the invention is the facility with which the lever may be installed at various locations along the channel which supports the pipes.

A still further feature of the invention is the fact that an abutment is provided which may be removed or moved. When in position it limits movement of the pipe or fitting which is positioned thereagainst.

A still further feature of the invention is the provision of various means for holding the pipes or fittings in position when it is necessary to disassemble sections. The channel construction lends itself to installation of chain around fittings which anchor the fittings in place while disassembly is accomplished. Further, the lever is provided with apertures to receive a rod which likewise engages fittings and may be used to pull the fittings apart.

A further advantage of the present invention is the fact that one man can operate the device with ease whereas other assembly and disassembly apparatus require more than one operator.

Other objects of the present invention will become apparent upon reading the following specification and referring to the accompanying drawings in which similar characters of reference represent corresponding parts in each of the several views.

In the drawings:

FIG. 1 is a perspective view showing the tool used to assemble two pipe sections.

FIG. 2 is an exploded perspective view similar to FIG. 1 showing the use of the tool in disassembling two sections.

FIG. 3 is a fragmentary sectional view through a pipe joint showing the pipe ends and collar.

FIG. 4 is a perspective view of a fitting used to anchor one end of a chain to the channel.

This invention is used to assemble and disassemble that type of commercially available pipe and pipe fittings having a bell at one end which receives a specially formed rubber or rubber-like gasket, the gasket having an opening which receives the end of the mating pipe section or fitting. The fittings may be of various types such as T's, elbows, Y's and the like. The term "fitting" will be used to include these various types as well as pipe sections. Fitting 11 has a bell 12 at one end with an inside diameter greater than the outside diameter of the main length of the pipe. The opposite end 13 of fitting 11a has no enlargement. Within bell 12 is a collar 14 of rubber or rubber-like material having a flange 16 at one end having a diameter about equal to that of bell 12. Inwardly of flange 16, the collar is formed with a sleeve 17 of an inside diameter about equal to the outside diameter of fitting 11a. A restricted diameter abutment 18 is formed at the inner end of sleeve 17, said abutment having an inside diameter about equal to that of the inside diameter of fitting 11. Abutment 18 limits inward movement of the male end of fitting 11a forming the joint.

In assembling the joint, collar 14 is first installed inside bell 12. The fitting 11a is then forced inside sleeve 17 until it engages abutment 18 and thus a tight seal between sections 11 and 11a is accomplished. It is important when the two fittings 11 and 11a are forced together that their axes be accurately aligned and that the pushing force be directed parallel to said common axis. Unless this is done, the fitting 11a tends to stick in collar 14 and a proper joint cannot be obtained. The principal function of the tool which is the subject of this invention is to hold the two fittings 11 and 11a in alignment and to exert a push on fitting 11a which is parallel to the common axis. The tool can also be used to pull two fittings together when required.

A channel 21 is provided having a bottom 22 and sides 23. A trough 24 is welded to the bottom 22, said trough being a right angle in cross-section and directed upwardly. Fittings 11 and 11a rest in the trough 24 and are held in alignment thereby. At spaced intervals along sides 23 are keyhole-shaped slots 26. Each slot has an enlarged hole 27 and an upward extending opening 28 of a width less than the diameter of hole 27. The opposite sides 23 have slots 26 in alignment.

At one end of channel 21 is a brace 31 which supports an outward extending threaded stud 32. An abutment 33 is provided for one end of channel 21, said abutment 33 having an outer plate 34 apertured to receive stud 32 and held in place by washer 36 and nut 37. Projecting inwardly from plate 34 are angular sides 38 which are separated from each other a sufficient distance to clear the trough 24. Thus the abutment 33 may be installed on the lefthand end of channel 21 as viewed in FIGS. 1 and 2, the sides 38 fitting inside the sides 23 of channel 21 and resting on bottom 22. Stud 32 fits through the plate 34 and the nut 37 locks the abutment 33 in position. Preferably, the end of pipe fitting 11 engages the abutment plate 34 which limits its movement during the assembly operation.

Used with channel 21 is a tool 41 having a handle 40 of convenient but extended length and formed at its lower end with a clevis arrangement having arms 42 formed with spaced apertures 43 for a purpose hereinafter explained and also having at its lower end outward projecting lugs 44. The diameter of lugs 44 is less than that of slots 28. Hence, the handle 41 may be positioned anywhere along the length of channel 21 by inserting lugs 44 through opposed slots 26 on opposite sides 23. By reason of the fact that the holes 27 are larger than the openings 28, once the lugs are installed they are offset and are not readily disengaged until the operator is ready to remove the handle 41 from the channel 21. As is best shown in FIG. 1, two adjacent sections 11 and 11a are positioned with the remote end of section 11 in engagement with abutment 33. Lugs 44 are installed in slots 26 so that the arms 42 are close to the outer end of section 11a. Handle 42 is then swung in a counterclockwise direction as viewed in FIG. 1 which forces the arms 42 against the end of fitting 11a and provides a direct push of fitting 11a into collar 14 directly along the common axis of fittings 11 and 11a.

The disassembly operation is also facilitated by the present invention. Each of sections 11 and 11a is shown here as a Y having a main straight portion and also having an upward extending branch 51, 51a. In disassembling the two sections, the section 11a must be held stationary while the section 11a is pulled away therefrom. Various means may be used to hold section 11 stationary. As here shown, a chain 52 is employed. One end of chain 52 has a hook 50, which is hooked into one of the slots 26 on the back side 23 of FIG. 2. A fitting 53 shown in detail in FIG. 4 may be used in conjunction with one of the slots 22. Such fitting 53 has a hook 54 at one end which engages one of the links of chain 52. A laterally offset arm 56 extends outwardly from hook 54 and fits into one of the slots 28 and a reversely directed arm 57 extends back toward hook 54 and fits inside side 23. Accordingly, in use of fitting 53 the arm 53 is inserted through the most convenient slot 28 with hook 54 outside and portion 57 inside of the side 23. The link of chain 52 is engaged with the chain positioned to the right of the offset 51, thereby preventing movement of the fitting 11 to the right. A bar 61 is inserted through pairs of holes 43 in handle 41 and said bar 61 engages against extension 51a. Hence, when the handle 41 is swung in a clockwise direction as viewed in FIG. 2, the bar 61 forces fitting 11a to the right and away from fitting 11, pulling the joint apart. It will further be understood that the handle 41 may be attached farther to the right than shown in FIG. 2 and a chain engaged around the ends of bar 61 and extension 51a to pull extension 51a away from fitting 11.

It is understood that this invention has been described with reference to the example for purposes of clarity of understanding and that certain changes may be practiced within the scope of this invention and of the appended claims.

What is claimed is:

1. A tool for assembly of pipe and fittings comprising a channel having opposed sides each formed with a plurality of longitudinally spaced slots, a lever having clevis-like arms at its lower end within the sides of said channel and outward projecting lugs shaped to fit into opposed slots, and restraining means for restraining a fitting against longitudinal movement in said channel in at least one direction, whereby upon pivotal movement of said lever said arms push a fitting in said channel longitudinally of said channel.

2. A tool according to claim 1 which further comprises a trough fixed to the bottom of said channel, said trough facing upward to support a fitting above said channel.

3. A tool according to claim 1 in which said slots are keyhole shaped, the narrow dimensions of which are at least as great as the width of said lugs.

4. A tool according to claim 1 in which said restraining means comprises a transverse abutment extending across said channel and cooperating means on said abutment and said channel restraining relative movement of said abutment and said channel, said abutment positioned to engage and limit longitudinal movement of a fitting.

5. A tool according to claim 1 in which said restraining means comprises a chain, a means for attaching said chain to opposite sides of said channel, said chain of a length to extend across said channel and over the top of a fitting resting in said channel.

6. A tool according to claim 5 in which each of said arms has at least one aperture and which further comprises a pin to fit through said apertures and to engage an upstanding branch of a fitting resting in said channel.

References Cited
UNITED STATES PATENTS

| 968,022 | 8/1910 | Abbott | 254—29 |
| 1,870,607 | 8/1932 | Crane | 254—29 |
| 1,894,835 | 1/1933 | Smith | 29—237 X |
| 2,122,099 | 6/1938 | Jeffrey | 254—29 X |

ROBERT C. RIORDON, Primary Examiner

J. C. PETERS, Assistant Examiner